United States Patent [19]

Lolachi et al.

[11] 4,018,304

[45] Apr. 19, 1977

[54] LUBRICATION SYSTEM FOR A CENTRIFUGAL LIQUID PROCESSING SYSTEM

[75] Inventors: Houshang Lolachi; Herbert Goldsmith, both of Rockville, Md.

[73] Assignee: Baxter Travenol Laboratories, Inc., Deerfield, Ill.

[22] Filed: Oct. 8, 1975

[21] Appl. No.: 620,513

[52] U.S. Cl. .................... 184/7 R; 184/6; 233/1 R; 308/187

[51] Int. Cl.$^2$ ......................... F16N 9/02

[58] Field of Search ............ 184/6, 6.16, 7 R, 7 E, 184/7 F, 7 D, 6.28, 3 R, 6.26, 26, 31, 43, 50 R, 55 A, 56 A, 70, 77; 308/187, 97, 123; 233/1 R, 25

[56] References Cited

UNITED STATES PATENTS

| | | | |
|---|---|---|---|
| 1,570,356 | 1/1926 | Lane | 308/187 X |
| 1,691,015 | 11/1928 | Leister | 308/187 |
| 1,745,853 | 2/1930 | Krantz | 233/1 R X |
| 3,257,235 | 6/1966 | Steele et al. | 233/23 R X |
| 3,318,644 | 5/1967 | Johnson | 184/31 X |
| 3,327,938 | 6/1967 | Stallmann | 233/24 X |
| 3,353,712 | 11/1967 | Prescott | 184/7 D X |
| 3,659,674 | 5/1972 | Ferrario | 184/6.26 X |
| 3,785,460 | 1/1974 | Smith et al. | 184/77 X |
| 3,942,716 | 3/1976 | Jacobson et al. | 184/6.16 X |
| 3,951,476 | 4/1976 | Schulien et al. | 184/77 X |

FOREIGN PATENTS OR APPLICATIONS

| | | | |
|---|---|---|---|
| 444,496 | 3/1936 | United Kingdom | 308/187 |

*Primary Examiner*—Richard C. Pinkham
*Assistant Examiner*—Arnold W. Kramer
*Attorney, Agent, or Firm*—Richard G. Kinney; Eugene M. Cummings; Henry W. Collins

[57] ABSTRACT

A lubrication system for a centrifugal liquid processing apparatus or the like having a bearing subject to operation in a centrifugal force field includes a reservoir wherein a quantity of fluid lubricant to be applied to the bearing is contained, an accumulator for receiving lubricant from the bearing, a first flow path from the reservoir through the bearing to the accumulator, and a second flow path from the accumulator to the reservoir. During operation of the apparatus lubricant is forced by the centrifugal force field to flow along the first flow path from the reservoir, through the bearing and into the accumulator under pressure. When the apparatus is stopped, lubricant is forced to return from the accumulator along the second flow path to the reservoir. An orifice is provided in the first flow path to control the flow and pressure of the lubricant within the bearing, and check valves are provided to restrict the lubricant to a circulating route through the bearing.

12 Claims, 7 Drawing Figures

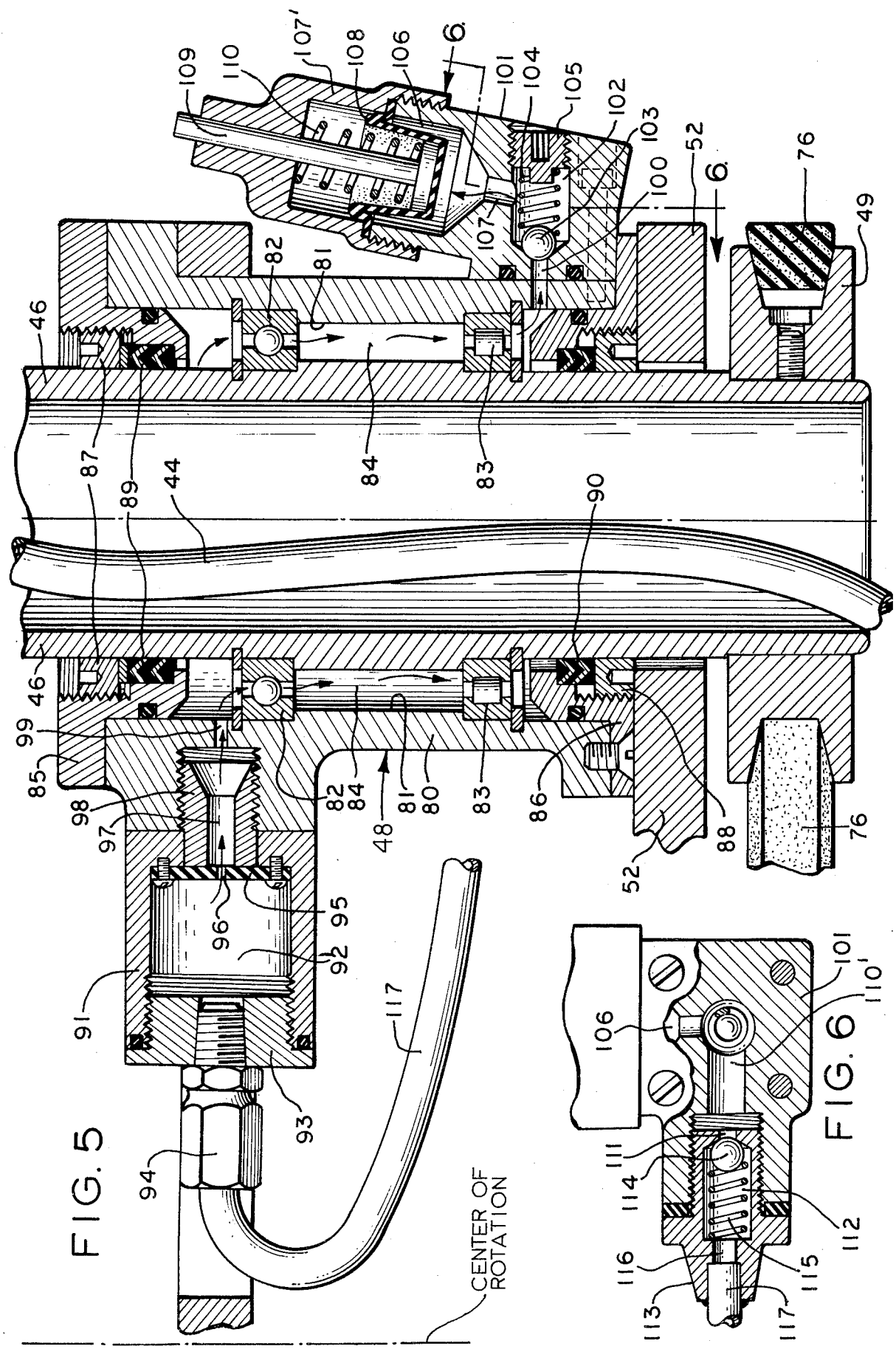

LUBRICATION SYSTEM FOR A CENTRIFUGAL LIQUID PROCESSING SYSTEM

BACKGROUND OF THE INVENTION

The present invention is directed generally to centrifugal liquid processing systems and apparatus, and more particularly to a lubrication system for such apparatus.

Centrifugal liquid processing systems, wherein a liquid having a suspended mass therein is subjected to centrifugal forces to obtain separation of the suspended mass, have found application in a wide variety of fields. For example, in recent years the long term storage of human blood has been accomplished by separating out the plasma component of the blood and freezing the remaining red blood cell component in a liquid medium such as glycerol. Prior to use the glycerolized red blood cells are thawed and pumped into the centrifugating wash chamber of a centrifugal liquid processing apparatus where, while being held in place by centrifugation, they are washed with a saline solution which displaces the glycerol preservative. The resulting reconstituted blood is then removed from the wash chamber and packaged for use.

The aforedescribed blood conditioning process, like other processes wherein a liquid is caused to flow through a suspended mass under centrifugation, necessitates the transfer of solutions into and out of the rotating wash chamber while the chamber is in motion. In the case of the aforedescribed blood processing operation, glycerolized red blood cells and saline solution are passed into the wash chamber, and waste and reconstituted blood solutions are passed from the chamber. To avoid contamination of these solutions, or exposure of persons involved in the processing operation to the solutions, the transfer operations are preferably carried out within a sealed flow system, preferably formed of a flexible plastic or similar material which can be disposed of after each use.

One centrifugal processing system particularly well adapted for such use is that described and claimed in the co-pending applications of Houshang Lolachi, Ser. Nos. 562,748 and 562,749, filed on Mar. 27, 1975 and assigned to the present assignee. This system established fluid communication between the rotating chamber and the stationary reservoirs through a flexible interconnecting umbilical cord without the use of rotating seals, which are expensive to manufacture and add the possibility of contamination of the blood being processed. In one preferred embodiment of this system a rotatably driven sleeve is provided on the end of a rotatably driven arm to guide the umbilical tube as the wash chamber rotates. This sleeve has proven difficult to lubricate in practice, the relatively high centrifugal forces present on the sleeve precluding the reliable long term operation of self-lubricated bearings, and the difficulty of establishing fluid communication with the rotating element precluding the use of pressure lubrication systems for this purpose. The present invention is directed to a lubrication system for such centrifugal liquid processing apparatus which is entirely automatic in operation and which may be added without substantial modification to the apparatus.

SUMMARY OF THE INVENTION

The invention is directed to a lubrication system for a bearing assembly of the type which is operable within a centrifugal force field and which includes at least one bearing adapted to receive a fluid lubricant. The lubrication system comprises means including a reservoir for containing a quantity of the lubricant, means including an accumulator for storing a quantity of the lubricant under pressure, means defining a first flow path for the lubricant when the bearing assembly is subjected to the force field from the reservoir through the bearing to the accumulator, and means defining a second flow path from the accumulator to the reservoir when the bearing is not subjected to the force field.

The invention is further directed to a bearing assembly of the type operable within a centrifugal force field and including at least one bearing adapted to receive a fluid lubricant. The assembly comprises means including a reservoir for containing a quantity of the lubricant, means including an accumulator for storing a quantity of the lubricant under pressure, first flow defining means establishing a first flow path for the lubricant from the reservoir through the bearing to the accumulator under the influence of the force field, the first flow defining means including an orifice for metering the flow of the lubricant and a check valve for restricting flow through the first flow path to a direction from the reservoir to the accumulator, and second flow defining means establishing a second flow path for the lubricant from the accumulator to the reservoir, the second flow defining means including a check valve for restricting flow through the second flow path to a direction from the accumulator to the reservoir.

BRIEF DESCRIPTION OF THE DRAWINGS

The features of the present invention, which are believed to be novel, are set forth with particularity in the appended claims. The invention, together with the further objects and advantages thereof, may best be understood by reference to the following description taken in connection with the accompanying drawings, in the several figures of which like reference numerals identify like elements, and in which:

FIG. 5 is an enlarged cross-sectional view of the lubrication system of the umbilical cable planetary guide assembly.

FIG. 6 is a cross-sectional view taken along line 6—6 of FIG. 5.

DESCRIPTION OF THE PREFERRED EMBODIMENT

Figure 1:
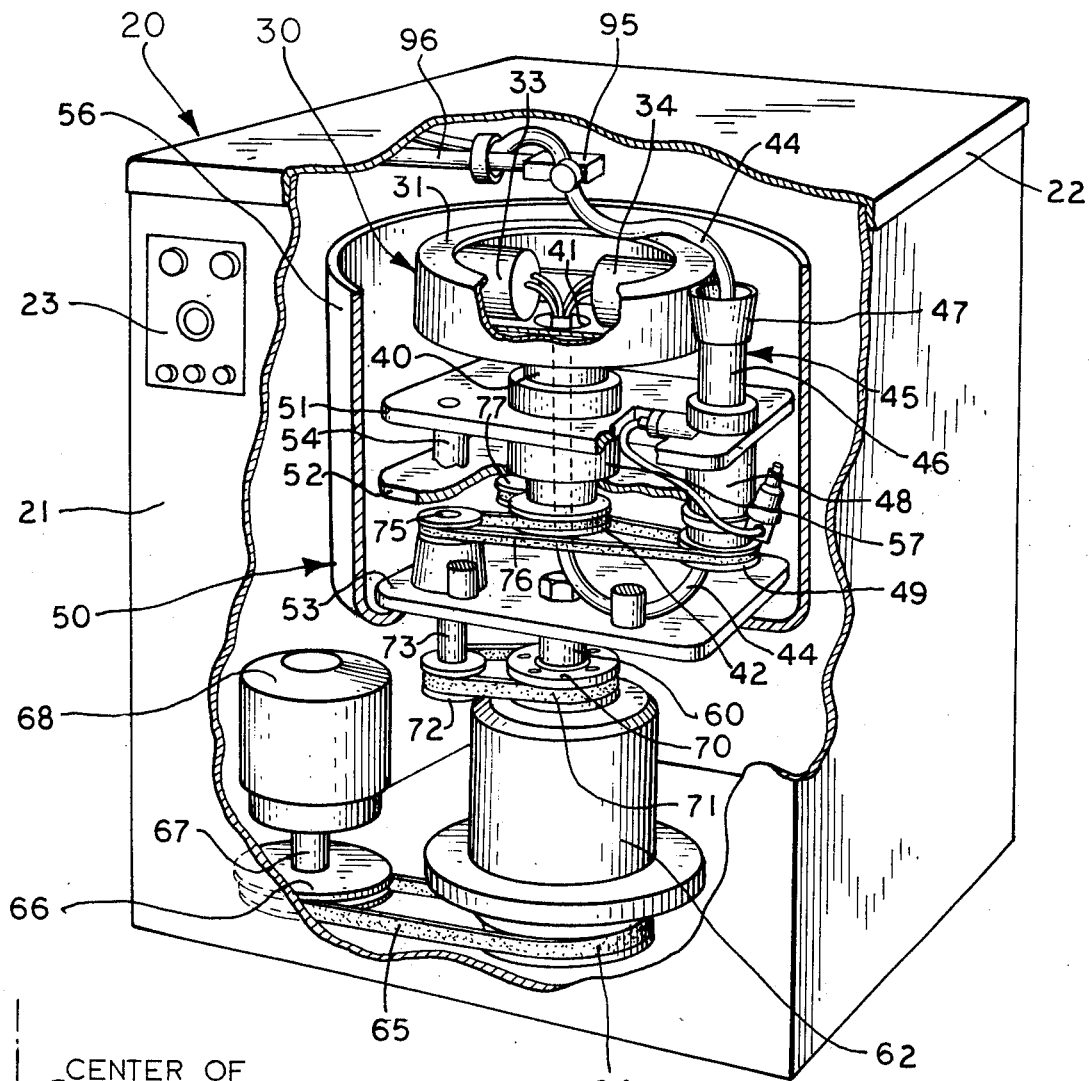
FIG. 1 is a perspective view of a centrifugal cell processing apparatus incorporating a lubrication system constructed in accordance with the invention, the processing apparatus being partially broken away to show its rotor and rotor drive assemblies, centrifugating wash bags, umbilical cable, planetary umbilicable cable guide assembly and guide assembly lubrication system.
Figure 2:
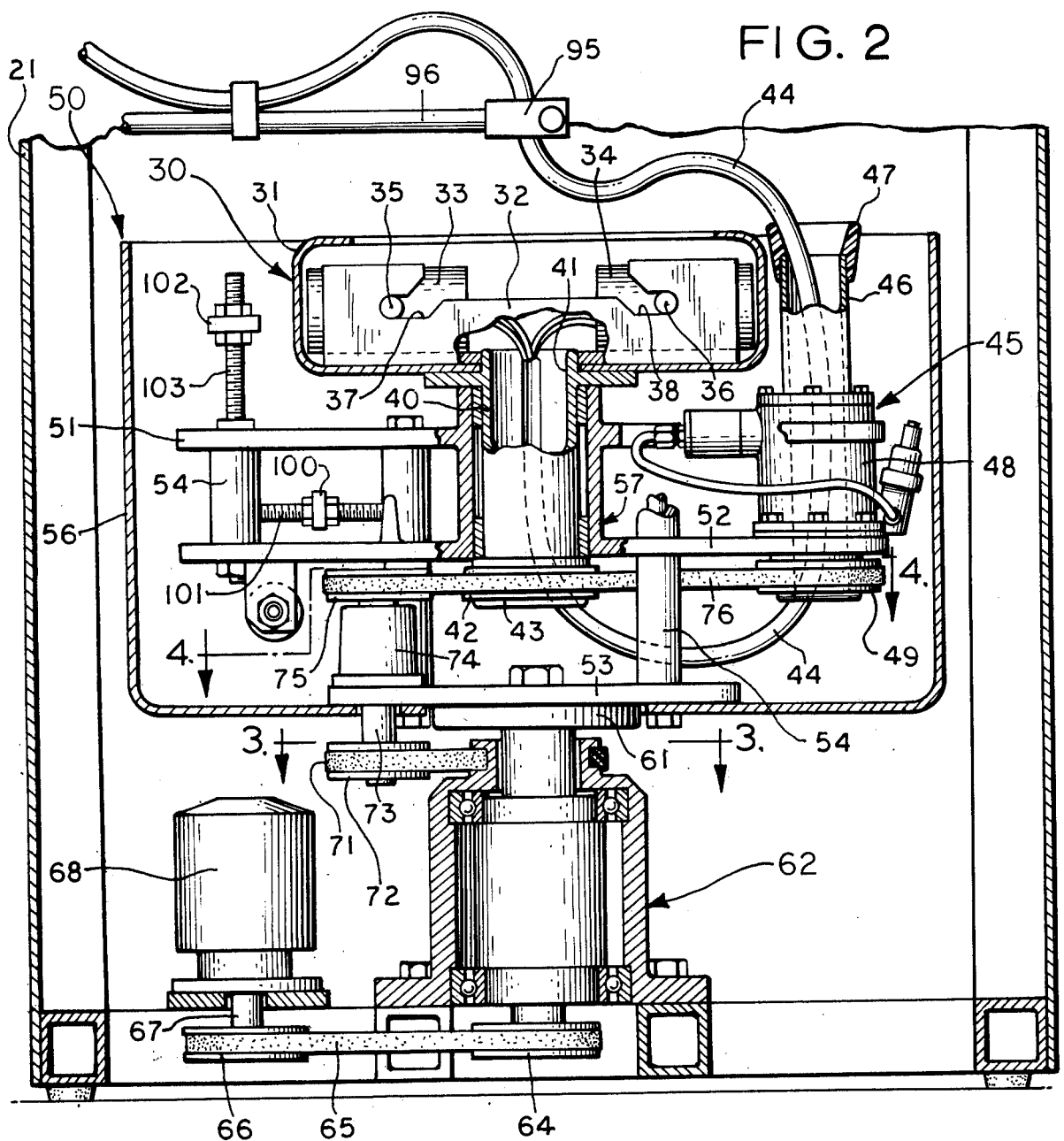
FIG. 2 is a front elevational view of the cell processing apparatus of FIG. 1 partially in cross-section and partially broken away to show the details of the rotor and rotor drive assemblies.

Referring to the figures, and particularly to FIGS. 1 and 2, a lubrication system constructed in accordance with the invention is shown in conjunction with a centrifugal liquid processing apparatus 20 adapted for processing glycerolized red blood cells. The red blood cell processing apparatus, which is preferably constructed in accordance with the apparatus described and claimed in the afore-identified copending application of Houshang Lolachi, Ser. No. 562,748, includes a cabinet or housing 21 which may be suitably insulated and lined to permit refrigeration of its interior. A hinged cover 22 provides access to the interior and a control panel 23 facilitates operator control of the operation of the apparatus.

The red blood cell mass to be processed is subjected to centrifugal force by means of a rotor assembly 30 which includes a bowl-shaped wind shield 31 for reducing wind friction, a central support bracket 32 (FIG. 2), and a pair of cylindrical support cups 33 and 34 in which the wash bags are contained. Cups 33 and 34, which are preferably machined of aluminum or stainless steel, are mounted in diametrically opposed positions on bracket 32 by means of opposed pairs of integral outwardly projecting pins 35 and 36 which engage respective ones of complementarily dimensioned slots 37 and 38 on bracket 32. Bracket 32 is attached at its center to the flanged upper end of a hollow vertically-aligned rotor drive shaft 40, which includes a central aperture 41 for accommodating an umbilical cable 44 which connects with the blood processing bags contained in cups 33 and 34. The bottom end of drive shaft 40 is fitted with a rotor drive pulley 42 and a free-rotating fairing 43.

The cell processing apparatus 20 further includes a rotor drive assembly 50 which includes three horizontal plate-like members 51, 52 and 53 held in a parallel spaced-apart configuration by a plurality of vertical spacers 54 and bolts 55, and a bowl-shaped wind shield 56, which is attached to the bottom surface of plate 53 and opens upwardly so as to encompass rotor assembly 30. Rotor assembly 30 is journaled to rotor drive assembly 50 by means of a vertical bearing or hub assembly 57 which extends between plates 51 and 52 and receives the rotor drive shaft 40.

In connecting with the exterior of apparatus 20 umbilical cable 44 passes through a planetary guide assembly 45. This guide assembly which includes a hollow vertically-aligned guide tube 46 fitted with a fairing cap 47 at its top end, is journaled to plate members 51 and 52 by means of a bearing assembly 48. The bottom end of guide tube 46 is fitted with a drive pulley 49.

The rotor drive assembly 50 is journaled to the machine frame for rotation about the same axis as rotor assembly 30 by means of a vertical drive shaft 60 attached to plate 53 in axial alignment with rotor drive shaft 40 by means of a flange 61. Drive shaft 60 extends downwardly to a hub assembly 62, wherein a plurality of bearings 63 are provided for lateral and vertical support.

Figure 3:
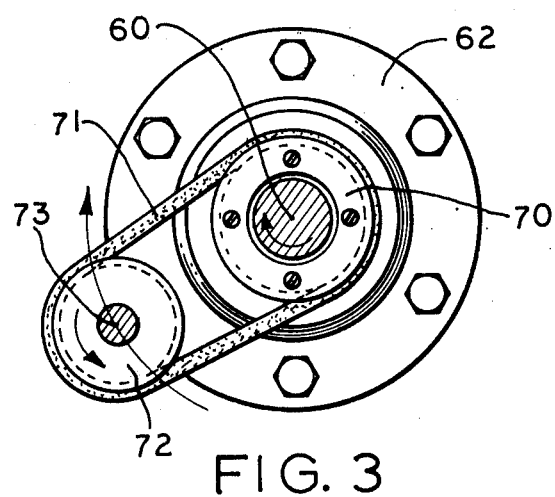
FIG. 3 is a cross-sectional view taken along line 3—3 of FIG. 2 showing the drive belt arrangement provided for the rotor drive assembly.
Figure 4:
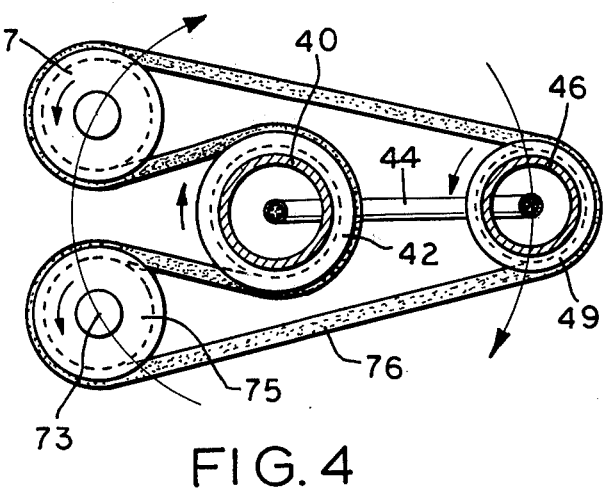
FIG. 4 is a cross-sectional view taken along line 4—4 of FIG. 2 showing the drive belt arrangement provided for the rotor assembly.

To provide drive power to the rotor drive assembly, the bottom end of drive shaft 60 is fitted with a drive pulley 64. This pulley is coupled by a drive belt 65 to a motor pulley 66, which is carried on the drive shaft 67 of a conventional electric drive motor 68. To provide drive power to rotor assembly 30, the top surface of hub assembly 62 is fitted with a stationary ring-type pulley 70. As shown most clearly in FIG. 3, this pulley is coupled by a belt 71 to a lower planetary drive pulley 72, which is fitted to the bottom end of a planetary drive shaft 73, which is journaled by means of a bearing assembly 74 to the bottom plate member 53 of rotor drive assembly 50. An upper planetary drive pulley 75 is fitted to the top end of the shaft 73 and, as shown most clearly in FIG. 4, this pulley is coupled by a drive belt 76 to rotor drive pulley 42 and to the drive pulley 49 of guide tube 46 with the assistance of an idler pulley 77 journaled to plate member 53.

By reason of the aforedescribed drive belt arrangements, rotor assembly 30 is caused to turn in the same direction as, and at twice the rotational speed of, rotor drive assembly 50. In the illustrated embodiment, as the rotor drive assembly 50 is turned clockwise (as viewed from above in FIGS. 3 and 4) by motor 68, planetary drive shaft 73 and upper planetary drive pulley 75 turn counterclockwise by reason of belt 71 and the stationary pulley 70. The counterclockwise rotation of pulley 75 results in clockwise rotation of rotor drive pulley 42, andhence of rotor assembly 30, by reason of the loop-back arrangement of belt 76 between these pulleys.

A 2:1 speed relationship between rotor assembly 30 and rotor drive assembly 50 is maintained by the relative arrangement of the drive pulleys. Specifically, the same ratio of diameters must be maintained between pulley 70 and pulley 72 as between pulley 42 and pulley 75. This assures that the planetary drive arrangement will have a direct transfer ratio of 1:1 which, when the rotation of the planetary drive shaft 73 about the axis of rotation of drive assembly 50 is taken into account, results in an ultimate transfer ratio of 2:1. As will become evident presently, this relationship of relative speed and direction is necessary if the system is to operate without the use of rotating seals.

At the same time the planetary umbilical guide tube 46 is rotated in the opposite direction to and at one-half the speed of rotor drive shaft 40, thus establishing a planetary-like relationship with respect to the rotor axis. This is, as rotor drive assembly 50 rotates, guide tube 46 may be thought of as always facing in the same direction with respect to a stationary observer viewing the apparatus. This minimizes friction between the guide tube and umbilical cable 44.

The drive belts and pulleys utilized to drive the guide tube, rotor and rotor drive assemblies may be conventional cogged belts and pulleys of the type commonly used for timing applications where slippage is to be avoided. Drive belts 65 and 71 have cogs on their inside surfaces only, whereas drive belt 76 has cogs on both its inside and outside surfaces.

The cell washing operation is performed in a pair of wash chambers taking the form of collapsible plastic bags (not shown) contained within cups 33 and 34. These wash bags, which preferably form part of a disposable presterilized sealed flow system, the structure and operation of which is described in the afore-identified copending application of the present inventor, Ser. No. 562,749, are preferably formed with a cylindrical body portion and a conical end portion. Complementarily shaped cavities are provided in cups 33 and 34 for receiving the wash bags.

Fluid communication is established between the wash bags, which rotate with rotor assembly 30, and the non-rotating portion of the cell processing system by means of umbilical cable 44 which contains separate passageways or conduits for this purpose. As best shown in FIGS. 1 and 2, umbilical cable 44 is suspended from a point above and axially aligned with rotor assembly 30 by means of a clamp assembly 95 located at the end of a stationary support arm 96. From this point the cable extends generally downwardly and radially outwardly, passing through the center of guide tube 46, then downwardly and radially inwardly and upwardly through the hollow center of rotor drive shaft 40 to a location between cups 33 and 34, where the umbilical cable connects with inlet and the outlet tubes from the wash bags. Fairing 43, which is journaled to drive shaft 40 at its bottom end so as to rotate freely with respect thereto, serves to reduce friction between the umbilical cable 44 and the drive shaft.

The rotor drive assembly 50 is maintained in radial balance by means of a first counterbalancing weight 100 carried on a radially-aligned threaded support member 101 on plate members 52 opposite guide assembly 45. By turning weight 100 on member 101 the weight can be positioned to compensate for the weight of the guide assembly, including the weight imposed thereon by umbilical cable 44 as it passes through guide tube 46. A second counterbalancing weight 102 is carried on an axially-aligned threaded support member 103 to obtain lateral balance.

In operation, umbilical cable 44 is prevented from becoming twisted during rotation of rotor assembly 30 by the coaxial half-speed rotation of rotor drive assembly 50, which imparts a like rotation with respect to the rotor axis to the umbilical cable through guide tube 46. That is, if rotor assembly 30 is considered as having completed a first 360° rotation and rotor drive assembly 50 a 180° half-rotation in the same direction, the umbilical cable 44 will be subjected to a 180° twist in one direction about its axis. Continued rotation of rotor 30 for an additional 360° and drive assembly 50 for an additional 180° will result in umbilical cable 44 being twisted 180° in the other direction, returning the cable to its original untwisted condition. Thus, umbilical cable 44 is subjected to a continuous flecture or bending during operation of the cell processing apparatus but is never completely rotated or twisted about its own axis.

The 180° of umbilical cable 44 is assisted by the planetary motion of the hollow umbilical cable guide tube 46. As the umbilical cable flexes the inside surfaces of guide 46 remain stationary with respect to the cable, minimizing friction and wear on the cable.

The planetary rotation of guide tube 46 presents special lubrication problems within hub assembly 48 by reason of the large centrifugal force acting on this hub assembly as a result of its being positioned at a location radially distant from the center of rotation of drive shaft 40 and base plate 51. In practice, this spacing may exceed 15 inches and shaft 40 and the base plate may be rotated at speeds in excess of 1500 RPM, resulting in a centrifugal field of over 960 g's being developed within bearing assembly 48. This causes the lubricant inside the bearing assembly to accumulate on the side of the bearing away from the center of rotation, preventing proper lubrication of guide tube 46 and generating a pressure on the bearing seals in excess of 90 psi. Under these conditions the lubricant leaks out around the seals and the bearing becomes subject to rapid wear.

Referring to FIG. 5, the bearing assembly 48 comprises a housing 80 through which a central axially-aligned bore 81 is provided for accommodating the umbilical cable guide tube 46. The guide tube 46 passes through bore 81 and is held in position therein by means of an upper ball bearing assembly 82 and a lower roller bearing assembly 83. These bearing assemblies space the outer surface of guide tube 46 from the inside surface of bore 81, thereby developing an intervening void 84 through which a lubricant may pass. The ends of void 84 are sealed by means of seal assemblies 85 and 86 positioned at the top and bottom of the bearing assembly, respectively. These seal assemblies include packing nuts 87 and 88 and chevron packings 89 and 90, respectively.

In accordance with the invention, to supply lubricant to the void 84 adjacent guide shaft 46, housing 80 incorporates at its top end nearest the center of rotation of drive shaft 40 a reservoir consisting of a housing section 91 within which a cylindrical chamber 92 is defined. An end cap 93 is threaded over the end of the housing section and is provided with a fitting 94 through which lubricant can enter chamber 92.

The other end of chamber 92 is fitted with a plate 95 which includes a central orifice 96. This orifice establishes communication between chamber 92 and a passageway 97 contained in a plug 98 threaded into the body of housing 80. Passageway 97 communicates with a passageway 99 which extends radially with respect to the wall of housing 80 and into communication with the axial void 84.

Lubricant is removed from the bottom end of bearing assembly 48 through a radially-aligned passageway 100 located at the side of housing 80 most distant from the center of rotation of shaft 40. A second housing section 101 fitted to housing 80 at this location defines a first internal chamber 102 within which a check valve assembly consisting of check valve 103 and spring 104 are provided to prevent lubricant from entering void 84 through passageway 100. The check valve and spring are held in position by a plug 105 removably threaded into housing section 101.

Housing section 101 also defines a second internal chamber 106 connected by a passageway 107 with chamber 102. Chamber 106 contains a flexible membrane or bellows 108 which separates the chamber into two separate compartments. A plunger 109 is slidably mounted behind the bellows and biased by a spring 110 so as to cause the bellows to decrease the volume of that portion of the chamber on the other side of the bellows. A removable cap 1071 is threaded onto the end of housing portion 101 to hold the bellows 108 in position.

To accommodate the outflow of lubricant from chamber 106 housing section 101 includes a second passageway 111 (FIG. 6) which communicates with a third internal chamber 112 provided in a plug 113 removably threaded into housing 101. A check valve 114 is situated within chamber 112 and is biased closed by a helical spring 115 contained within the chamber. The opposite end of chamber 112 communicates with a passageway 116 which connects with a semi-flexible tube 117. This tube extends around housing 80 to fitting 94 to allow lubricant from chamber 106 to return to reservoir 92 when the apparatus is not in operation.

In operation, a lubricant of relatively high viscosity, such as grease, is packed into reservoir 92. As the bearing assembly 48 is subjected to centrifugal force during operation this grease is forced through aperture 96 and passageways 97 and 99 into void 84. Orifice 96 serves to meter the flow of grease from reservoir 92 and to prevent excessive pressure from being developed within the bearing. The lubricant flows under the influence of centrifugal force along void 84 as shown until it ultimately exits through passageway 100. The lubricant then passes through check valve 103 into chamber 102, and from there through passageway 107 into the accumulator chamber 106 wherein it compresses spring 110 and slides piston 109 upwardly to increase the volume of the accumulator chamber.

Figure 7:
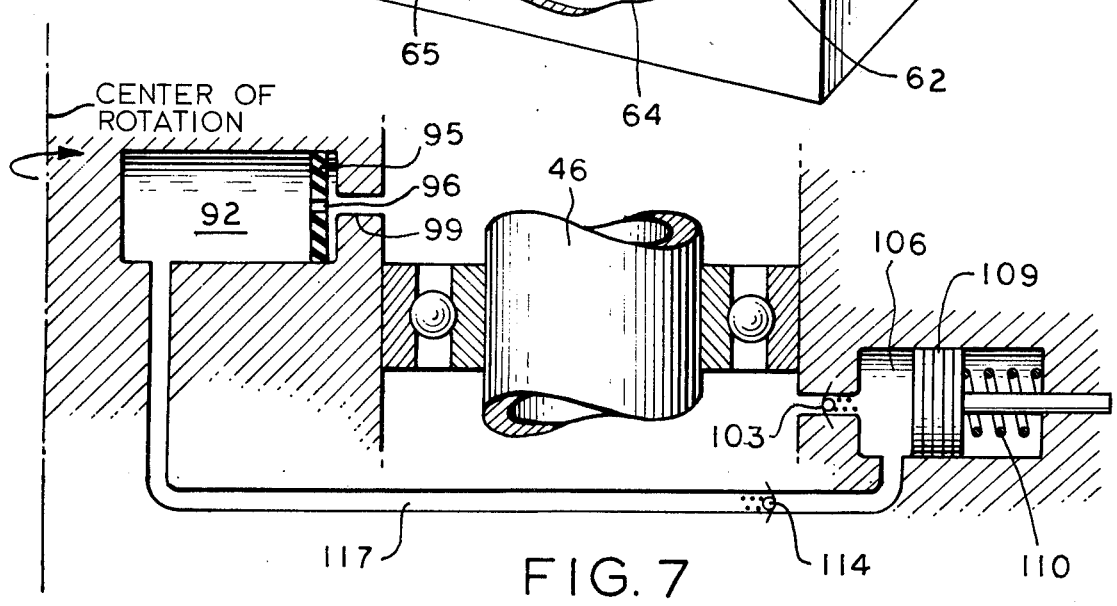
FIG. 7 is a simplified schematic diagram of the lubrication system useful in illustrating its operation.

When the centrifugal apparatus is stopped, a radial force is no longer exerted on the lubricant so that spring 110 is free to expand, pushing the lubricant back through passageway 107 into chamber 102. This causes check valve 103 to close, forcing the lubricant along passageway 111 and through check valve 114 into chamber 112. This flow continues until spring 110 has fully expanded, the lubricant being ultimately forced through tubing 117 back into reservoir 92. When the centrifugal apparatus is again operated the cycle repeats itself, the lubricant in reservoir 92 being again transferred by the radially-directed centrifugal force into accumulator 106. This operation can be most plainly seen by reference to FIG. 7, wherein the principal elements of the system are shown in schematic form.

Thus, the lubrication system results in a continuous and predetermined amount of lubricant being fed into the bearing seal assembly at a controlled pressure while the apparatus is in operation. This reduces leakage through seals 85 and 86 and assures an even distribution of the lubricant, thereby extending the life of the apparatus and reducing routing maintenance requirements.

It will be appreciated that while the lubrication system has been shown as having reservoir and accumulator portions formed as separate sections attached to housing 80, these elements could in appropriate circumstances be incorporated directly into housing 80. Furthermore, the elements could take on other forms and orientations.

While the lubrication system has been shown in conjunction with centrifugal apparatus 20 for processing biological cells, it will be appreciated that the system can be employed in connection with apparatus having other applications, such as the centrifugal processing of chemicals or waste liquids, or in other applications wherein continuous energy communication must be maintained between a stationary terminal and a rotating terminal by means of an energy-transmitting channel which itself does not rotate about its own axis.

While a paticular embodiment of the invention has been shown and described, it will be obvious to those skilled in the art that changes and modifications may be made without departing from the invention in its broader aspects, and, therefore, the aim in the appended claims is to cover all such changes and modifications as fall within the true spirit and scope of the invention.

We claim:

1. A lubrication system for a bearing assembly of the type operable within a centrifugal force field and including at least one bearing adapted to receive a fluid lubricant, said system comprising, in combination:
   means including a reservoir for containing a quantity of said lubricant;
   means including an accumulator for storing a quantity of said lubricant under pressure;
   means defining a first flow path for said lubricant when said bearing assembly is subjected to said force field from said reservoir through said bearing to said accumulator; and
   means defining a second flow path from said accumulator to said reservoir when said bearing is not subjected to said force field.

2. A lubrication system as defined in claim 1 wherein said means for defining said first flow path include an orifice for metering the flow of said lubricant.

3. A lubrication system as defined in claim 1 wherein said means for defining said second flow path include a check valve for restricting flow to a direction from said accumulator to said reservoir.

4. A lubrication system as defined in claim 3 wherein said means for defining said first flow path include a check valve for restricting flow to a direction from said reservoir to said accumulator.

5. A lubrication system for a bearing assembly of the type operable within a centrifugal force field and including at least one bearing adapted to receive a fluid lubricant, said system comprising, in combination:
   means including a reservoir for containing a quantity of said lubricant;
   means including an accumulator for storing a quantity of said lubricant under pressure;
   first flow defining means establishing a first flow path for said lubricant from said reservoir through said bearing to said accumulator under the influence of said force field, said first flow defining means including an orifice for metering the flow of said lubricant and a check valve for restricting flow through said first flow path to a direction from said reservoir to said accumulator; and
   second flow defining means establishing a second flow path for said lubricant from said accumulator to said reservoir, said second flow defining means including a check valve for restricting flow through said second flow path to a direction from said accumulator to said reservoir.

6. A lubrication system as defined in claim 5 wherein said orifice is disposed in said first flow path between said reservoir and said bearing.

7. In a centrifugal liquid processing apparatus of the type having
   a stationary base;
   a rotor drive assembly rotatably mounted to said base for rotation about a predetermined axis;
   a rotor assembly including at least one cell processing chamber, said rotor assembly being rotatably mounted with respect to said base for rotation about said axis;
   means including a flexible umbilical cable segment for establishing fluid communication with said processing container, one end of said cable segment being fixed with respect to said base along said axis at one side of said rotor assembly, the other end of said cable segment being attached along said axis in rotationally locked engagement to the other side of said rotor assembly;
   guide means for causing said umbilical cable segment to rotate about said axis with said rotor drive assembly, said guide means including a housing, a hollow guide sleeve for receiving said umbilical cable, and a bearing assembly including at least one bearing for rotatably mounting said guide sleeve to said housing at a location radially spaced from said axis, said bearing assembly being subjected to a centrifugal force field; and
   drive means for rotating said rotor assembly and said rotor drive assembly in the same direction with a speed ratio of 2:1 to prevent the umbilical cable from becoming twisted during rotation of said rotor;

a lubrication system for said bearing assembly comprising, in combination:

means including a reservoir for containing a quantity of lubricant in fluid form;

means including an accumulator for storing a quantity of said lubricant under pressure;

means defining a first flow path for said lubricant when said bearing assembly is subjected to said force field from said reservoir through said bearing to said accumulator; and means defining a second flow path from said accumulator to said reservoir when said bearing is not subjected to said force field.

8. A lubrication system as defined in claim 7 wherein said means for defining said first flow path include an orifice for metering the flow of said lubricant.

9. A lubrication system as defined in claim 8 wherein said means for defining said second flow path include a check valve for restricting flow to a direction from said accumulator to said reservoir.

10. A lubrication system as defined in claim 9 wherein said means for defining said first flow path include a check valve for restricting flow to a direction from said reservoir to said accumulator.

11. A bearing assembly of the type operable within a centrifugal force field and including at least one bearing adapted to receive a fluid lubricant, said system comprising, in combination:

means including a reservoir for containing a quantity of said lubricant;

means including an accumulator for storing a quantity of said lubricant under pressure;

first flow defining means establishing a first flow path for said lubricant from said reservoir through said bearing to said force field under the influence of said force field, said first flow defining means including an orifice for metering the flow of said lubricant and a check valve for restricting flow through said first flow path to a direction from said reservoir to said accumulator; and second flow defining means establishing a second flow path for said lubricant from said accumulator to said reservoir, said second flow defining means including a check valve for restricting flow through said second flow path to a direction from said accumulator to said reservoir.

12. A lubrication system as defined in claim 11 wherein said orifice is disposed in said first flow path between said reservoir and said bearing.

* * * * *